(12) United States Patent
Lakoduk

(10) Patent No.: US 8,544,225 B2
(45) Date of Patent: Oct. 1, 2013

(54) REMODELING CABLE PROTECTING PLATE

(76) Inventor: Everett L. Lakoduk, Santa Clara, CA (US)

( * ) Notice: Subject to any disclaimer, the term of this patent is extended or adjusted under 35 U.S.C. 154(b) by 399 days.

(21) Appl. No.: 12/430,078

(22) Filed: Apr. 25, 2009

(65) Prior Publication Data
US 2010/0269448 A1 Oct. 28, 2010

(51) Int. Cl.
*E04C 2/52* (2006.01)
(52) U.S. Cl.
USPC .......................................... 52/220.1; 52/699
(58) Field of Classification Search
USPC ............ 52/220.7, 220.1, 220.5, 317, 717.06, 52/699; 174/135, 507
See application file for complete search history.

(56) References Cited

U.S. PATENT DOCUMENTS

| | | | | |
|---|---|---|---|---|
| 3,211,824 A * | 10/1965 | Heiman | ........................ | 174/507 |
| 3,240,869 A * | 3/1966 | Jureit | ............................ | 174/135 |
| 3,297,815 A * | 1/1967 | Drettmann | .................... | 174/507 |
| 3,350,501 A * | 10/1967 | Jureit | ............................ | 174/135 |
| 3,553,346 A * | 1/1971 | Ballantyne | .................... | 174/507 |
| 3,689,681 A * | 9/1972 | Searer et al. | .................. | 174/507 |
| 4,807,417 A * | 2/1989 | Bell | ............................... | 52/699 |
| 4,924,646 A * | 5/1990 | Marquardt | .................... | 52/220.1 |
| 5,163,254 A | 11/1992 | Zastrow | | |
| 5,359,151 A * | 10/1994 | Nattel et al. | .................. | 174/480 |
| 5,960,603 A | 10/1999 | Redden et al. | | |
| 6,061,910 A * | 5/2000 | Williamson | ............. | 29/897.312 |
| 6,479,749 B1 * | 11/2002 | Vrame | .............................. | 174/67 |
| 6,642,445 B1 * | 11/2003 | Lalancette | .................... | 174/507 |
| 6,642,455 B2 | 11/2003 | Moller et al. | | |
| 6,935,079 B1 * | 8/2005 | Julian et al. | ..................... | 52/357 |
| 7,601,918 B2 * | 10/2009 | Pamperin | ..................... | 174/135 |
| 2003/0126824 A1 * | 7/2003 | Jensen | ............................ | 52/715 |

FOREIGN PATENT DOCUMENTS

| | | |
|---|---|---|
| CA | 1096412 | 2/1981 |
| CA | 1142729 | 3/1983 |

OTHER PUBLICATIONS

Press-on Nail Plate.

* cited by examiner

*Primary Examiner* — Branon Painter
(74) *Attorney, Agent, or Firm* — Jon Fallon, Esq.

(57) ABSTRACT

A metal plate used to protect service lines (i.e. electrical wires) in a remodeling application characterized by a stamped raised surface on each end of an arched plate with two nail receiving notches to contain the service lines under the plate and secure the plate in place. Upon installation, the plate then functions as a major repair to the wallboard and thus has time saving multi-part purposes.

13 Claims, 5 Drawing Sheets

REMODELING CABLE PROTECTING PLATE

FIELD OF THE INVENTION

This invention relates to the manufacture of a metal article for use in wood frame construction and light metal frame construction. This present invention relates particularly to a stamped metal plate, similar to a cable protecting plate, and having an improved shape rendering it useful in a remodeling application.

BACKGROUND OF THE INVENTION

Cable protecting plates are used to prevent the inadvertent penetration of wires, pipes, and tubing also known as service lines, by fasteners such as nails and screws in construction. These plates have a variety of shapes depending upon the framing function (bearing wall, partition wall, furring wall) and construction material (wood, metal and thin strips for furring). To date none of these plates are particularly well suited for remodeling when the wall covering is already installed and will remain installed everywhere with the exception of the reasonably immediate locale of the actual protecting plate.

Typically, in construction remodeling, service lines are added to a wall or ceiling by removing areas of wallboard, (sometimes known as drywall or plaster), either in long strips or entirely, then drilling holes in the framing members, thereby passing cables through the member and reinstalling wallboard.

When possessing this plate, to add new service lines it is more practical to create a series of small penetrations in the wallboard at each point where the new service lines will intersect an existing framing member in order to gain access to the wall's interior space henceforth called the "void". The service lines can be installed by bringing them out of the wallboard, crossing them over the framing member and reinserting them back into the void, repeating this "lacing" process as needed. The service lines needing to be protected now rest on top of and intersect the framing member and this new plate will rest on top of the service lines and also intersect the member.

By installing this remodeling cable protecting plate at each point where the penetrations occurred, the service lines will be simultaneously protected from future accidental puncture and securely fastened, both of which are required by universal building codes, and the wall voids created to gain access to the wall interior void will be covered making a suitable backing for a simplified repair of the damaged wallboard using a common wallboard compound.

What makes all of the current cable protecting plates incompatible with the above described remodeling technique is that they are either shaped wrong and/or have features which will damage the wires they are intended to protect. When installing this remodeling cable protecting plate by gently hammering a chisel into the plate's chisel grip combined with its nuanced shape, the plate will position snugly with no risk of damaging the service lines. The two nails when installed have a twofold purpose; 1) they capture the service lines and keep them under the plate and 2) they set the plate to a depth slightly below the surface of the existing wallboard making for a fast and imperceptible repair.

OBJECTS AND SUMMARY OF THE INVENTION

As is commonly known, a number of service lines, which are typically non-metallic sheathed wires are used for many purposes in both residential and commercial construction. They include but are not limited to: high voltage cables, low voltage cables, fiber optical, water tubing and gas tubing. As time goes on and building materials are invented and subsequently approved by local and national code regulating committees they seem to be in a more flexible form and thus simpler to install products. Examples are the manifold water systems used now extensively in climates where freezing occurs. These systems rely upon flexible plastic tubing that will resist expansion found in rigid pipes and thus are less susceptible to breaking during a deep freeze weather event. Another example of materials moving from rigid to flexible is in gas lines. There are now entire systems of gas lines that are flexible and can be installed in walls and in service access areas, complete with engineered fittings.

This invention pertains to the application of these more flexible products in a retrofit or remodeling application, that is where the wallboard commonly known as the drywall or plaster, is already in place and will substantially remain so. Because of the nature of typical frame construction, there is of necessity a void created between each structural member. Gaining access to this void for the purpose of concealing new service lines is at the heart of why this invention is necessary. Where installing a service line that is flexible in nature, this inspires the installer of the product to conceive methods of installation that are less invasive than would be necessary with the installation of conventional rigid materials. Since these service lines are flexible, there is not typically any need to remove large sections of wallboard to gain access to the void between structural members as the service lines can be "snaked" through these voids in any number of ways with relative ease. These methods almost always involve a technique that will bring the new flexible product "over" the structural member, either by simply placing it on top of the structural member or by notching the same member within the acceptable parameters set forth by various building codes. Upon arriving at this obvious conclusion there is of necessity the requirement of also protecting the newly installed flexible service line product with some form of protective plate that will prevent it from being inadvertently punctured either during the installation process or afterward when the occupant may require a fastener in the structural member for any unrelated reason. Since the service lines are now substantially at the surface of the wallboard, that is that they progress from being roughly at center of the void while traversing the void, to then being just below the surface of the wallboard when passing over the structural member, the service line will need a larger surface of protection. And since the service line is installed through an access hole in the wallboard roughly the size of the hammer head that created it, the protective plate will necessarily want to be installed parallel with the service line so as to also aid in the repair of the wallboard by backing the small hole created in it to gain access to the void between the structural members.

Prior protective devices provided to avoid the inadvertent punctures of these service lines have all assumed that the structural member was accessible and that the void between the members are relatively open and accessible for the purpose of installing service lines. Not only is this evident in all drawings and descriptions to date, but it is also evident when considering the integral attachment provisions these devices incorporate into their design, which is typically some form of integral teeth. Given the need for the protective plate to parallel the service line in the above description of a remodeling application, the existence and the placement of these "teeth" render these prior protective plates potentially destructive to the very service line they are to protect if they are used in parallel to the service lines as described above.

In order to overcome the above mentioned disadvantages the present invention provides for a metallic protective plate of a rust resistant type in an elongated rectangular shape and with a slight bend from the center to each end in the flat surface. Said plate will be of a suitable thickness so as to prevent a fastener from easily piercing it and will have been struck in a direction so as to prevent any sharp edges in the striking process from being on the concave surface. Additionally, said plate will have two raised areas at each end rising up on the convex surface for the purpose of aiding in installation with a tool such as a chisel. These raised surfaces will be raised high enough for such a tool to catch but not enough for a nail to easily enter. Said plate will also have two indentations at the center point indicating desired nail placement. These indentations will also aid in keeping the plate firmly under the head of a common nail. The nails which keep the plate attached to the framing member will also serve to keep the service lines under the protective plate. Additionally, the nails will aid the installer in setting and maintaining the plate at a level just below the surface of the wallboard. When the plate is securely in place with two nails and the service lines are securely retained between the nails or fasteners and under the nail plate, and the nail plate has been set at a level just below the aggregate surface level of the wallboard around it, said plate has created a suitable structural repair of the wallboard and may be covered with a common multi-purpose wallboard compound, commonly referred to in the trade as "mud".

These and other objects and advantages of the invention will be more apparent upon reference to the following specification claims and appended drawings wherein:

BRIEF DESCRIPTION OF THE DRAWINGS

Several embodiments of the present invention will now be described by way of example only, with reference to the accompanying drawings in which.

DETAILED DESCRIPTION OF THE INVENTION

Figure 1:
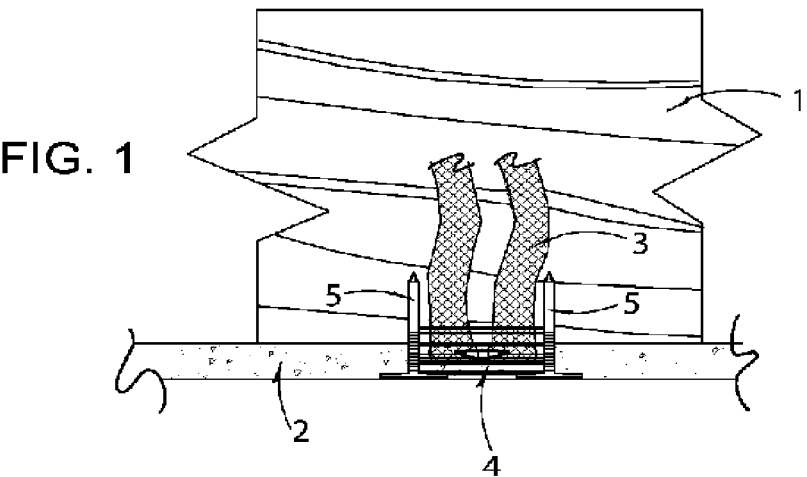
FIG. 1 is a side view of an embodiment of the plate of the present invention covering service lines after installation.

FIG. 1 is an end view showing a limited lateral view of a framing member 1 with wallboard 2 over it. There are two service lines 3 under the plate 4 shown as an end view. The nails 5 hold the plate in place and also keep the service lines under the plate.

Figure 2:
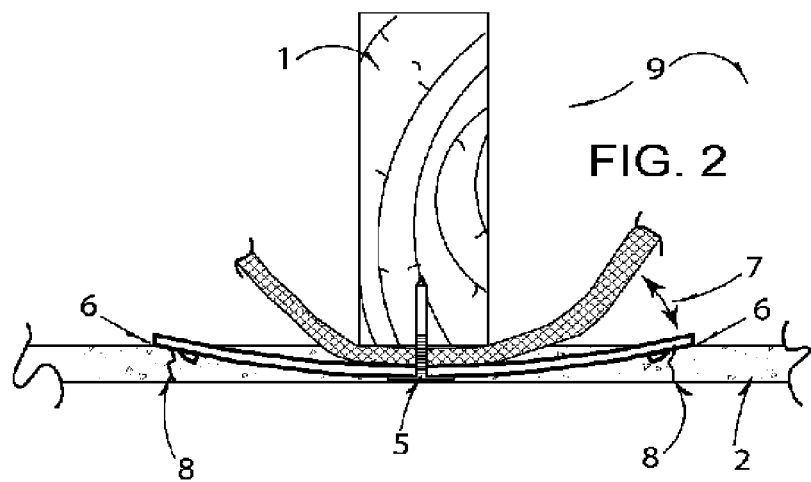
FIG. 2 is a top view of an embodiment of the plate as shown in FIG. 1.

FIG. 2 is a side view of the plate shown in FIG. 1. The plate is resting on top of the inside surface of the existing wallboard 6 when it is properly installed, and inside the boundaries of the access holes 8. There is a space 7 between the end of the plate and the service line which keeps the extended parts of the service line well within the void 9 between structural members 1. The nails 5 fix the plate in place at a level of just slightly below the surface of the wallboard 2.

Figure 3:
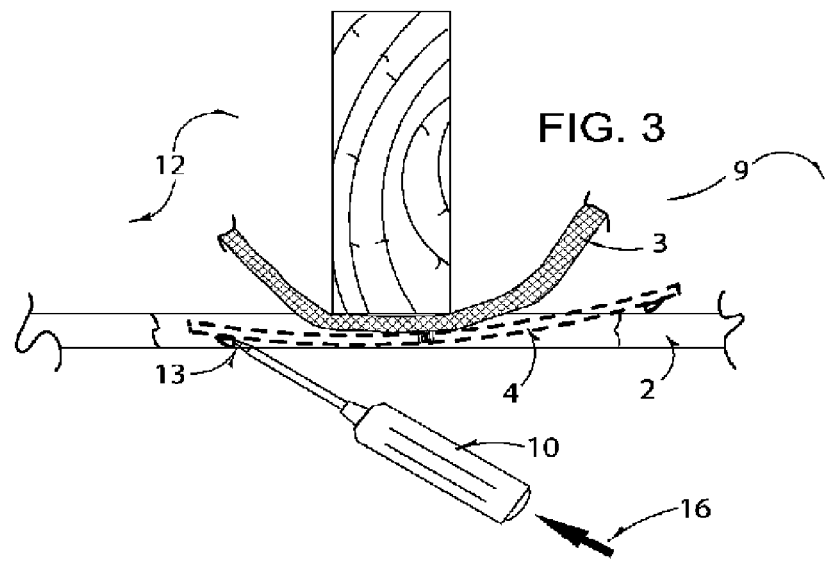
FIG. 3 is a top view of an embodiment the plate showing the plate being installed, one step prior to completion.

FIG. 3 is a side view of the plate 4 (the hash line indicates the plate is in motion, the arrow 16 indicates the direction of motion), as it is being installed over the service line, just before it has been pushed up into the void 9 space using a tool such as a chisel 10. The tool is kept securely in place and will not slip into the void, but will instead push the plate into place because of the indentation 13 on the convex surface of the plate. Upon pushing the plate completely into the second void 12 hole with a tool such as a chisel, the plate will then be held in place by the tension generated by it being pivoted on top of the framing member 1 and under the wallboard 2.

Figure 4:
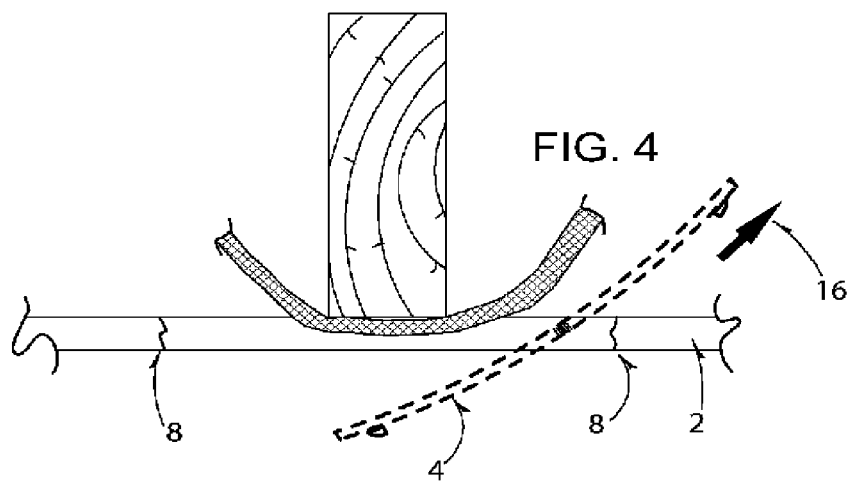
FIG. 4 is a top view of an embodiment of the plate showing the plate at the initial stage of being installed.

FIG. 4 is a side view of the plate 4 (the hash line indicates the plate is in motion, the arrow 16 indicates the direction of motion), as it is being installed indicating the initial placement well within one of the two voids holes 8, resting upon the inside surface of the wallboard 2, from which it will slide as it is being pushed up into place to cover the service lines.

Figure 5:
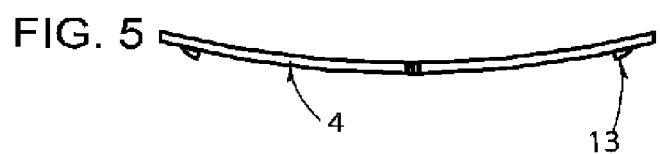
FIG. 5 is a lateral view of the edge of an embodiment of the plate showing the slight bend.

FIG. 5 is a lateral view of the edge of the plate showing the slight bend. It is important to note that this bend is intentionally not exaggerated because to do so would cause the plate to sit loosely in the hole and could also fall out prior to placing the nails. It also indicates the approximate placement and degree of the raised features 13 for use in installing the plate. These raised features are not intended to be a hole, but rather a notched surface that will catch a tool such as a chisel when installing it. These raised surfaces 13 will ideally not be any higher than about the thickness of the material of the plate 4 or possibly slightly less, so as to not create a hole wherein a nail or other type of fastener could easily enter.

Figure 6:
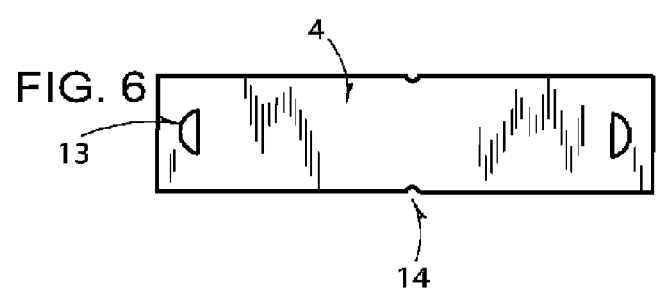
FIG. 6 is a front view of the convex surface of an embodiment of the plate indicating an approximate placement of the raised features.

FIG. 6 is a view of the convex surface of the plate and also indicates the approximate placement of the raised features 13. It also shows the notches 14 on each end which are important for keeping the plate securely in place. Additionally these notches will prevent a common nail or fastener from slipping past the plate 4 when setting the plate to the desired height. Although often the plate 4 will slip up into the desired access opening hole and seat itself firmly in place, it is advisable to also nail it in place. To this end these nail indication notches will then serve as a nudge to the conscience of the installer that perhaps there is another step needed to be sure due diligence has been met.

Figure 7:
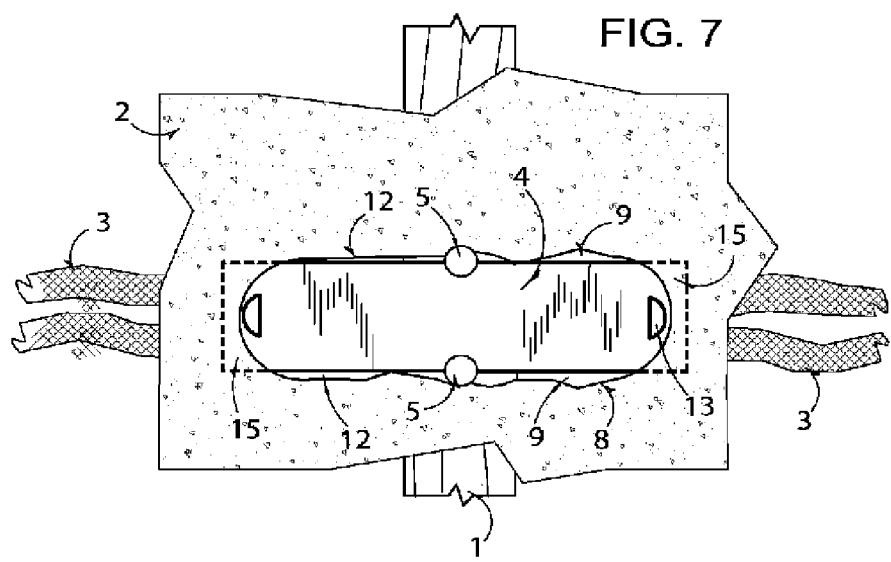
FIG. 7 is a front view of an embodiment of the plate with the addition of the surrounding native materials.

FIG. 7 is the same view as FIG. 6 with the addition of the surrounding native materials as well as the service lines 3 passing over the framing member 1. The plate 4 has been placed into the access hole 8 on one end then pushed into the other access hole using a tool such as a chisel resting on one of the raised features 13. The plate is now resting securely under the wallboard on each end 15 and is held in place by the tension generated by it being pivoted on top of the framing member and under the wallboard. The nails 5 are in place and only a small amount of the initial void holes 9 & 12 are remaining, which can easily be filled and finished with a common drywall compound.

Figure 8:
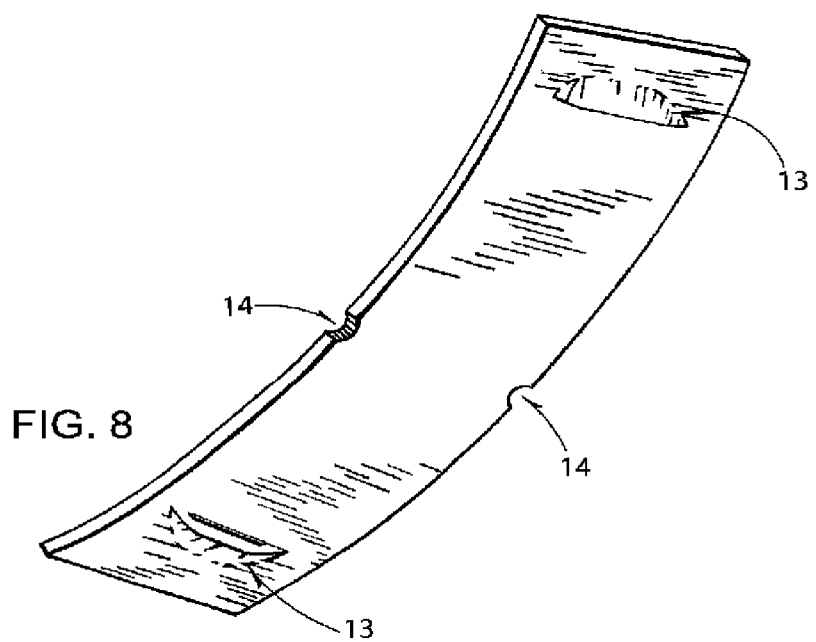
FIG. 8 is a perspective view of an embodiment of the plate.

FIG. 8 is a perspective view of the plate showing all of the features described above and is not intended to give scale or dimension. It is simply an aid for visualizing the device.

What is claimed is:
1. A framing construction system comprising:
  a cable protecting plate having an upper convex surface and a lower concave surface, a first side edge and a second side edge, and a first end and a second end;
  an opening provided in wallboard;

wherein the protecting plate is substantially rectangular in shape and inserted within the opening in the wallboard, with the lower concave surface being placed over a service line positioned across a structural support to prevent typical fasteners from penetrating the service line; and wherein the protecting plate is pivoted around the structural support and the upper convex surface of the protecting plate and rests against an inside surface of the wallboard to secure by tension the protecting plate in the opening in the wallboard.

2. The framing construction system of claim 1, further comprising a slight bend extending along a length of the plate between the first end and the second end.

3. The framing construction system of claim 2 further comprising at least one protrusion on at least one of the upper convex and lower concave surfaces adequate for engaging a tool.

4. The framing construction system of claim 3, further comprising at least a notch centered on at least one of the first and second side edges for indicating and aiding nail placement.

5. The framing construction system of claim 3 wherein the protrusion further comprises a notched surface dimensioned so as not to create a hole wherein a nail or other fastener could easily enter.

6. The framing construction system of claim 2 wherein the concave surface of the protecting plate facilitates pivoting of the protecting plate around the structural support providing for easy insertion within the wall opening.

7. The framing construction system of claim 1 wherein the protecting plate inserted within the wall opening is set at a level just below the aggregate surface level of the wallboard, providing for a smooth wall surface when covered with drywall compound.

8. A framing construction system for protection of electrical wires comprising:

a metallic plate having a first end spaced apart from a second end, a concave surface, and an edge;

an opening formed in wallboard exposing a portion of a structural support and electrical wires;

wherein the protecting plate is pivoted around the structural support and the first and second ends of the protecting plate rest against an inside surface of the wallboard to secure the protecting plate in the opening in the wallboard; and wherein the concave surface rests along an electrical wire extended over the structural support and inhibits penetration of a wall fastener by shielding the electrical wire from damage.

9. The framing construction system of claim 8 wherein the concave surface facilitates the insertion of the plate within an opening in a wall by pivoting around the structural stud.

10. The framing construction system of claim 9 wherein the concave surface is adaptable to extend from the first end over the structural stud to the second end of the plate.

11. The framing construction system of claim 9 further comprising;

at least one opening along the convex surface, the opening forming a raised feature along the convex surface; and wherein the raised feature provides for engagement of a tool for insertion of the shield within the opening in the wall.

12. The framing construction system of claim 9 further comprising;

at least one cutout along the edge for securing the shield to the structural stud.

13. The framing construction system of claim 9 wherein the edge further comprises a dimension sufficient for aligning the plate within the wall opening and providing for a smooth wall surface when covered with wallboard compound.

* * * * *